United States Patent [19]

Heidjann

[11] Patent Number: 4,881,920
[45] Date of Patent: Nov. 21, 1989

[54] SELF-PROPELLING HARVESTER THRESHER

[75] Inventor: Franz Heidjann, Harsewinkel, Fed. Rep. of Germany

[73] Assignee: Claas OHG, Fed. Rep. of Germany

[21] Appl. No.: 271,092

[22] Filed: Nov. 14, 1988

[30] Foreign Application Priority Data

Nov. 17, 1987 [DE] Fed. Rep. of Germany ....... 3738991

[51] Int. Cl.⁴ .................. A01F 7/04; A01F 12/10; A01F 12/46
[52] U.S. Cl. ........................ 460/66; 460/69; 460/114
[58] Field of Search ............... 460/114, 59, 66, 69, 460/79, 77, 80; 56/14.6, 16.4; 209/241, 247

[56] References Cited

U.S. PATENT DOCUMENTS 2,670,582  3/1954  Hyman ........................... 460/114 X
4,478,226 10/1984  Tophinke ........................ 460/69
4,610,127  9/1986  Eguchi et al. .................. 460/59 X Primary Examiner—Stephen J. Novosad
Attorney, Agent, or Firm—Michael J. Striker

[57] ABSTRACT

A self-propelling harvester thresher, particularly a caterpillar-driven small harvester thresher for rice or the like comprises a threshing and separating mechanism operating in accordance with an axial flow system, a sieve device for separating a grain-chaff mixture and having a transporting bottom, and a transporting device arranged to transport the grain-chaff mixture from the threshing and separating mechanism to the sieve device, the transporting device including a trough and at least one collecting and transferring screw which is supported in the trough and extends transversely to a travelling direction, the collecting and transferring screw having two oppositely running screw plates provided on its ends and a throwing scoop provided in its center, the collecting and transferring screw and the trough being arranged before the transporting bottom as considered in a product throughgoing direction and substantially in a same horizontal plane with the transporting bottom.

10 Claims, 2 Drawing Sheets

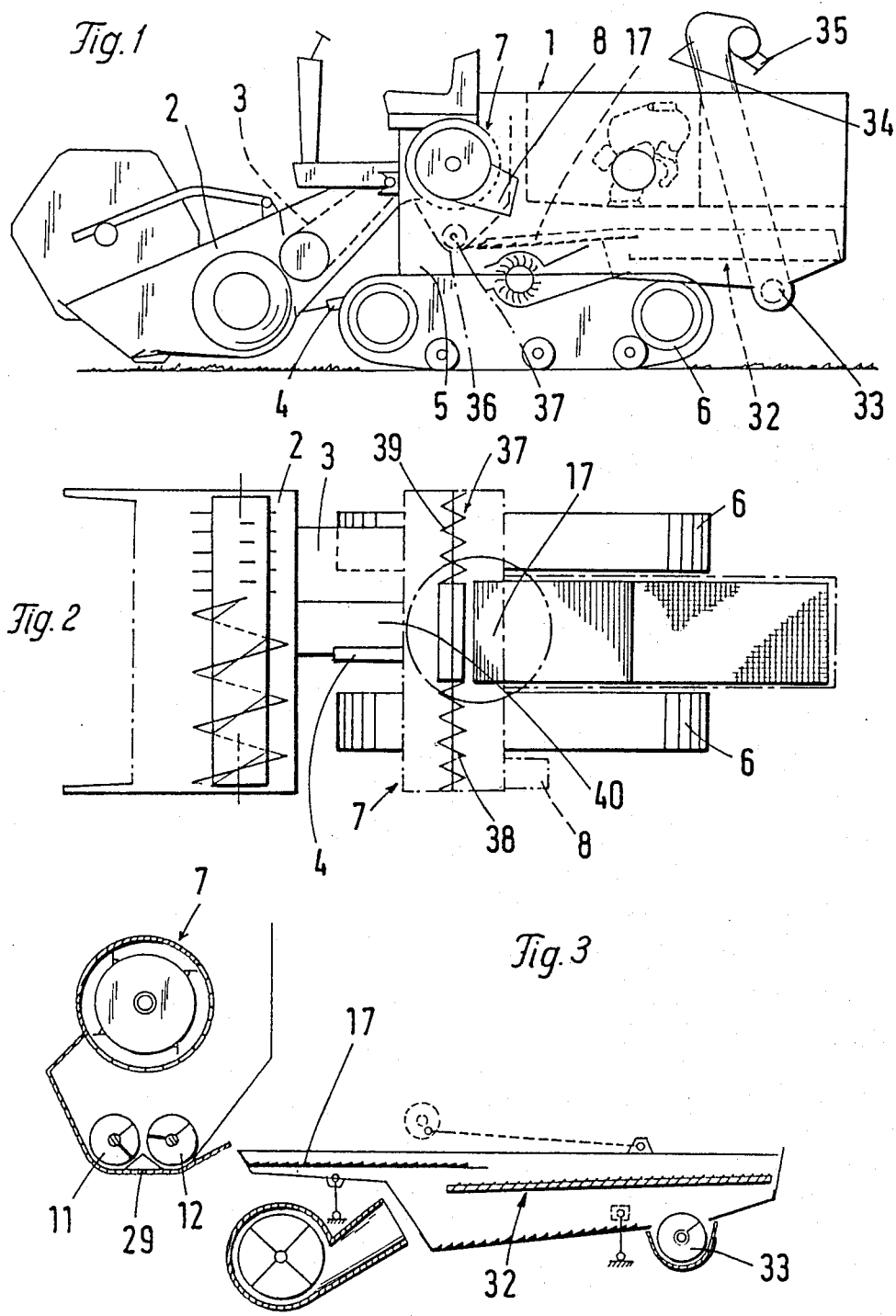

SELF-PROPELLING HARVESTER THRESHER

BACKGROUND OF THE INVENTION

The present invention relates to a self-propelling harvester thresher.

More particularly, it relates to a self-propelling harvester thresher, particularly a caterpillar-driven harvester thresher for rice or the like, with a threshing and separating mechanism which extends transversely to a traveling direction and operates in accordance with an axial flow system, and which also has a sieve device with a transporting bottom, and a transporting device located under a threshing and separating mechanism and transporting a grain-chaff mixture to the transporting bottom of the sieve device.

In the practice, the transporting device which transports the grain-chaff mixture to transporting bottoms in the harvester threshers of the known type are formed as a transporting screw with a relatively great diameter. This transporting screw is located above the transporting bottom with a distance therefrom, and in some cases with arrangement of a further transporting element, such as for example disclosed in the Patent Document Nos. DBP 2,812,655 and 1,938,082. Because of this multi-level arrangement of the individual aggregates and because of the relatively great diameter of the transporting screw, the known harvester threshers are very high. Such a high construction is especially undesirable in small harvester threshers for rice harvesting. In this small harvester thresher its outer dimensions must not exceed the loading size for overseas containers. Complying with this requirement, it has been known to make the aggregates which overlap the container loading height.

SUMMARY OF THE INVENTION

Accordingly, it is an object of the present invention to provide a harvester thresher which avoids the disadvantages of the prior art.

More particularly it is an object of the present to provide a self-propelling harvester thresher which is formed so that without dismounting of its parts can be loaded as a complete functional unit in a sea container and transported with the latter.

In keeping with these objects and with others which will become apparent hereinafter, one feature of the present invention resides, briefly stated, in a self-propelling harvester thresher in which the transporting device includes at least one collecting and transferring screw which extends transversely to a travelling direction and supported in a trough and also provided with screw plates at its ends running in an opposite direction and with a throwing scoop located centrally between the screw plates, wherein the transporting screw and the associated trough is arranged in a product through-going direction before a transporting bottom of a sieve device and substantially in the same horizontal plane with the latter.

When the self-propelling harvester thresher is designed in accordance with the present invention it achieves the above specified objects.

In accordance with another feature of the present invention, the transporting device has two transferring screws which are supported in troughs and arranged one after the other and parallel to one another, wherein each of the transporting screws is provided on its ends with oppositely running screw plates and centrally with a throwing scoop.

The throwing scoop of the first transferring screw as considered in a product transporting direction can have a width which substantially corresponds to half width of the transporting bottom.

The throwing scoop of the first transferring screw can be connected at its end side directly to the oppositely running screw plates of the first transferring screw.

The shaft of the first screw as considered in a product transporting direction, can be centrally provided with a product separating disc.

In the second transferring screw, two throwing scoops can be provided out of center with a distance therebetween which is equal approximately to the width of the throwing scoop of the first transferring screw.

In addition the second transferring screw can be provided with a further central throwing scoop with a width substantially corresponding to the width of the first transferring screw.

The throwing scoops of the second transferring screw can be separated from one another by discs arranged on the screw shaft of this transferring screw.

The troughs of the transferring screws can be separated from one another by two lateral separating plates which extend transversely to a product stream and spaced from one another by a distance which corresponds to the width of the throwing scoop of the first transferring screw. Finally both troughs can be provided in the central region with a common bottom which slightly raises toward the transporting bottom.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of a harvester thresher in accordance with the present invention;

FIG. 2 is a plan view of the harvester thresher of FIG. 1 without a threshing and separating mechanism;

FIG. 3 is a schematic, partial section of a preferable embodiment of the threshing and separating mechanism and the sieve device in accordance with the present invention;

DESCRIPTION OF A PREFERRED EMBODIMENT

Figure 5:
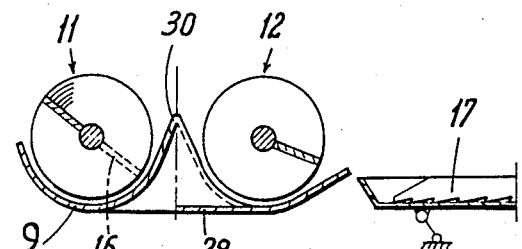
FIG. 5 is a view showing a section taken along the line V—V in FIG. 4.

A small harvester thresher is identified as a whole with reference numeral 1. It has a known front cutting mechanism trough 2 which is turnably connected with a housing 5 of the harvester thresher through an inclined conveyor 3 and a displacement cylinder-piston unit 4. The housing 5 of the harvester thresher is supported on a caterpillar-type landing gear 6, and thereby the harvester thresher can be used for example for the rice harvesting.

The harvester thresher has an axial threshing and separating mechanism 7 which operates transversely to a travelling direction. The axial threshing and separating mechanism has a straw outlet 8 provided at its one end. Under the threshing and separating mechanism 7, as shown in FIGS. 1 and 2, a transfer conveyor 37 is arranged. The transfer conveyor 37 extends parallel to the longitudinal axis of the threshing and separating mechanism 7 and is provided at its ends with screw plates 38 and 39 which run in opposite directions. In the central region between the screw plates 38 and 39, the transfer conveyor 37 is provided with at least one throwing scoop 40 connected with the screw plates 38 and 39.

Figure 4:
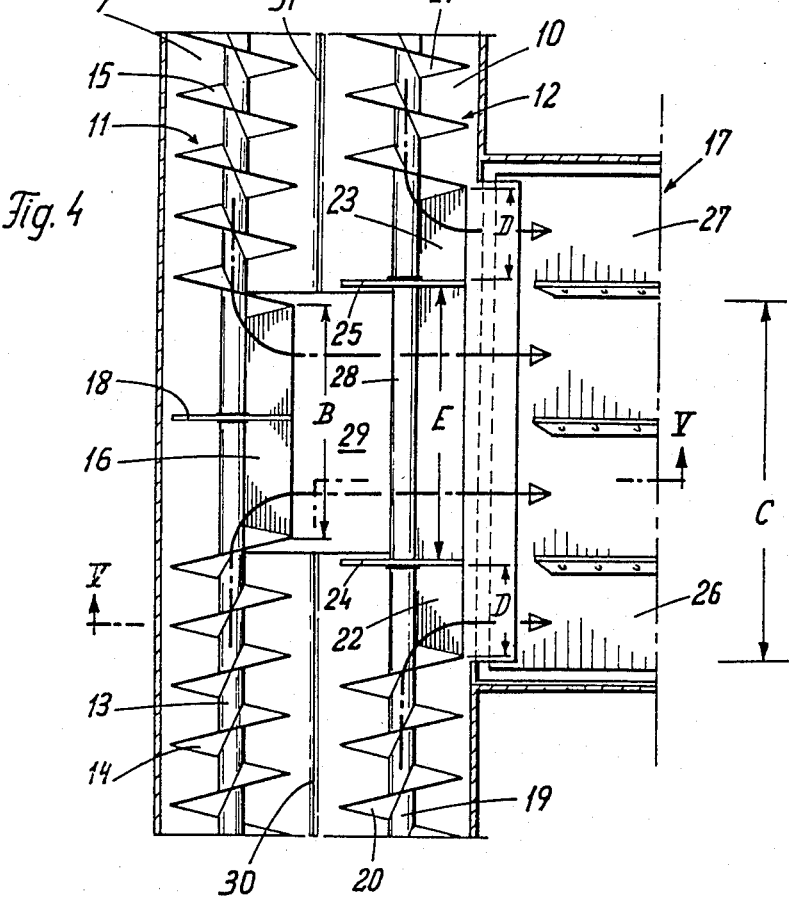
FIG. 4 is a view showing a region which is indicated in FIG. 2 in dash-dot line and illustrating the embodiment with a double transferring screw on an enlarged scale.

In accordance with the invention transfer screws 11 and 12 are arranged under the threshing and separating mechanisms 7 and extend parallel to one another. The transfer screws 11 and 12 are supported in troughs 9 and 10 and have a relatively small diameter. As can be seen from FIG. 4, screw plates 14 and 15 are provided in the end regions of a screw shaft 13 of the first transfer screw 11 as considered in a product transporting direction and transport the product opposite to one another to the center. The remaining central part of the shaft 3 is provided with a throwing scoop 16. The width B of the throwing scoop 16 substantially corresponds to the half width C of a transporting bottom 17, so that from the scoop 16 the central part of the transporting bottom 17 is supplied with grain-chaff mixture. For guaranteeing this also during threshing on slopes, a product separating disc 18 is welded centrally on the shaft 13.

The second transfer screw 12 as considered in the product transporting direction is supported in the trough 10 and includes a shaft 19 and oppositely running screw plates 20 and 21 which are arranged at the ends of the shaft. The shaft 19 carries throwing scoops 22 and 23 which on one end are connected to the screw plates 20 and 21 and on the other end are limited by the product separating disc 24 and 25. The width D of the throwing scoops 22 and 23 is selected so that by them both edge regions 26 and 27 of the transporting bottom 17 are supplied with grain-chaff mixture. A further throwing scoop 28 is arranged on the shaft 19 between both discs 24 and 25. The width E of the throwing scoop 18 substantially corresponds to the width B of the scoop 16.

These two scoops cooperates with one another for transporting the mixture which is collected by the first screw 11, to the transporting bottom 17. For this purpose the troughs 9 and 10 in the region of operation of the scoops 16 and 28 are provided with a common bottom 29. As can be seen from FIG. 5 the common bottom 29 is slightly raised upwardly. In addition, both troughs 9 and 10 are separated from one another by supporting plates 30 and 31. As can be seen from FIG. 3, the lower walls of the troughs 9 and 10 lies substantially on the same horizontal plane as the transporting bottom 17. Thereby instead of one great conveyor two screws 11 and 12 of relatively small diameter are arranged near one another, and a flat, compact construction of the whole harvester thresher is achieved.

From the transporting bottom 17, the grain-chaff mixture runs in a known manner to a sieve device 32 in which the chaff is separated from grain. The grain is transported by a collecting screw 33 which is located under the sieve device, to an outlet pipe 35 through an elevator 34. Sacks for filling and collecting the grain are suspended on the pipe 35 in a known manner.

It will be understood that each of the elements described above, or two or more together, may also find a useful application in other types of constructions differing from the type described above.

While the invention has been illustrated and described as embodied in a self-propelling harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A self-propelling harvester thresher, particularly a caterpillar-driven small harvester thresher for rice or the like, comprising a threshing and separating mechanism operating in accordance with an axial flow system and extending transversely to a travelling direction; a sieve device for separating a grain-chaff mixture and having a transporting bottom; and a transporting device arranged to transport the grain-chaff mixture from said threshing and separating mechanism to said sieve device, said transporting device including a trough and at least one collecting and transferring screw which is supported in said trough and extends transversely to the travelling direction, said collecting and transferring screw having two oppositely running screw plates provided on its ends and a throwing scoop provided in its center, said collecting and transferring screw and said trough being arranged before said transporting bottom as considered in a product throughgoing direction and substantially in a same horizontal plane with said transporting bottom.

2. A self-propelling harvester thresher as defined in claim 1, wherein said transporting device includes two such transferring screws which are arranged one after the other in the travelling direction and extend parallel to one another and two such troughs on which said transferring screws are supported, each of said transferring screws being provided with oppositely running screw plates on its ends and with a throwing scoop between said screw plates.

3. A self-propelling harvester thresher as defined in claim 2, wherein said transporting bottom has a predetermined width, said transferring screws including a first transferring screw as considered in a product transporting direction, said throwing scoop of said first transferring screw having a width which substantially corresponds to half width of the transporting bottom.

4. A self-propelling harvester thresher as defined in claim 2, wherein said transferring screws include a first transferring screw as considered in the product transporting direction, said throwing scoop of said first transferring screw having two ends arranged directly near said screw plates of said first transferring screw.

5. A self-propelling harvester thresher as defined in claim 2, wherein said transferring screws include a first screw as considered in a product transporting direction, said first transferring screw having a shaft and being provided with a product separating disc in a center of said shaft.

6. A self-propelling harvester thresher as defined in claim 2, wherein said transferring screws include a first transferring screw and a second transferring screw located after said first transferring screw as considered in a product transporting direction, said throwing scoop of said first transferring screw having a predetermined width, said second transferring screw having two throwing scoops arranged outside of a center of said second transferring screw and having therebetween a distance which substantially corresponds to the width of said throwing scoop of said first transferring screw.

7. A self-propelling harvester thresher as defined in claim 6, wherein said second transferring screw has a further central throwing scoop with a width which corresponds to the width of said first transferring screw 8. A self-propelling harvester thresher as defined in claim 7, wherein said second transferring screw has two discs arranged on said shaft of said second transferring screw and separating said throwing scoops of said second transferring screw from one another.

9. A self-propelling harvester thresher as defined in claim 2; and further comprising two lateral separating plates which extend transversely to a product stream and separates said troughs of said transferring screws from one another, said throwing scoop of said first transferring screw having a predetermined width, said separating plates being spaced from one another by a distance which substantially corresponds to said width of said throwing scoop of said first transferring screw.

10. A self-propelling harvester thresher as defined in claim 1, wherein said troughs have a common bottom which is located in a central region and slightly raises toward said transporting bottom.

* * * * *